Figure 1:
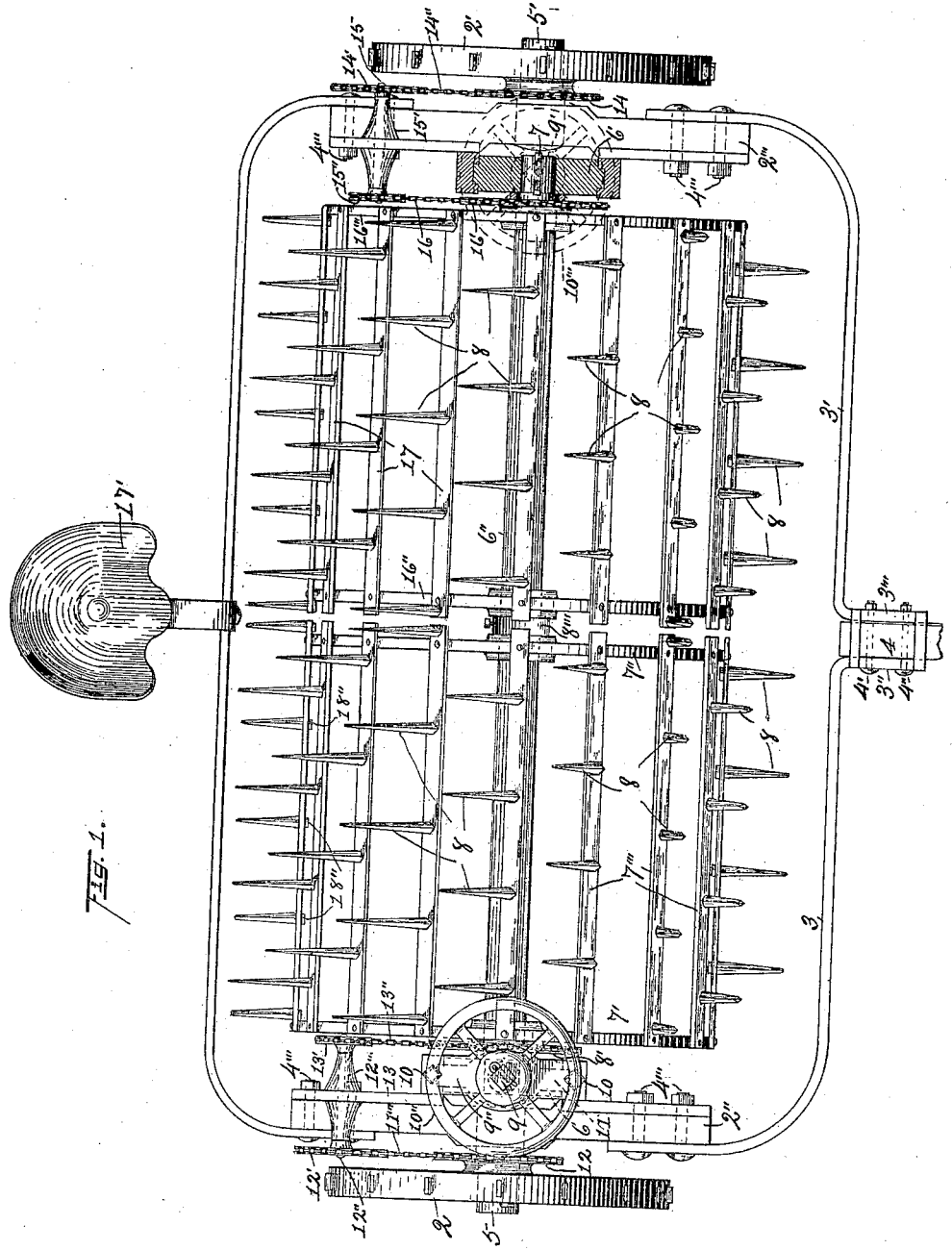

S. SCHÄLLER.
ROTARY HARROW.
APPLICATION FILED SEPT. 24, 1909.

971,218.

Patented Sept. 27, 1910.

3 SHEETS—SHEET 1.

Witnesses:
Inventor
Sigmund Schäller
By his Attorney
Albert C. Tanner

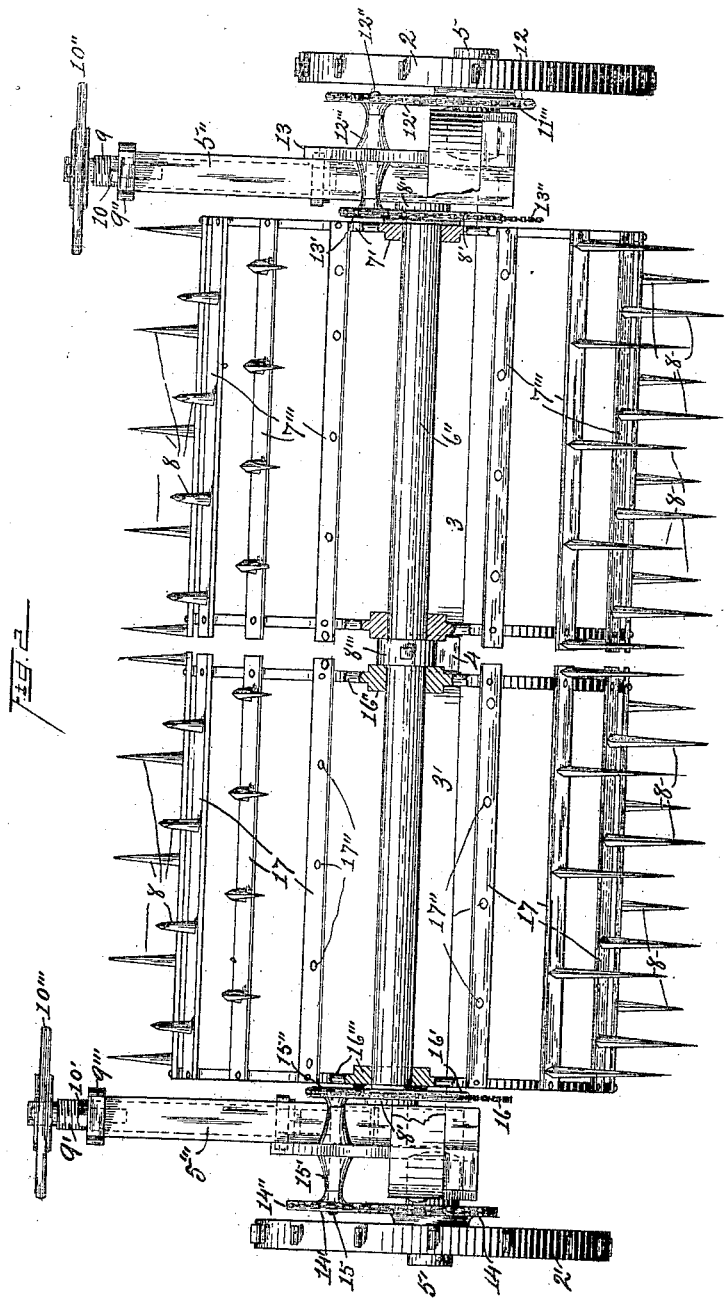

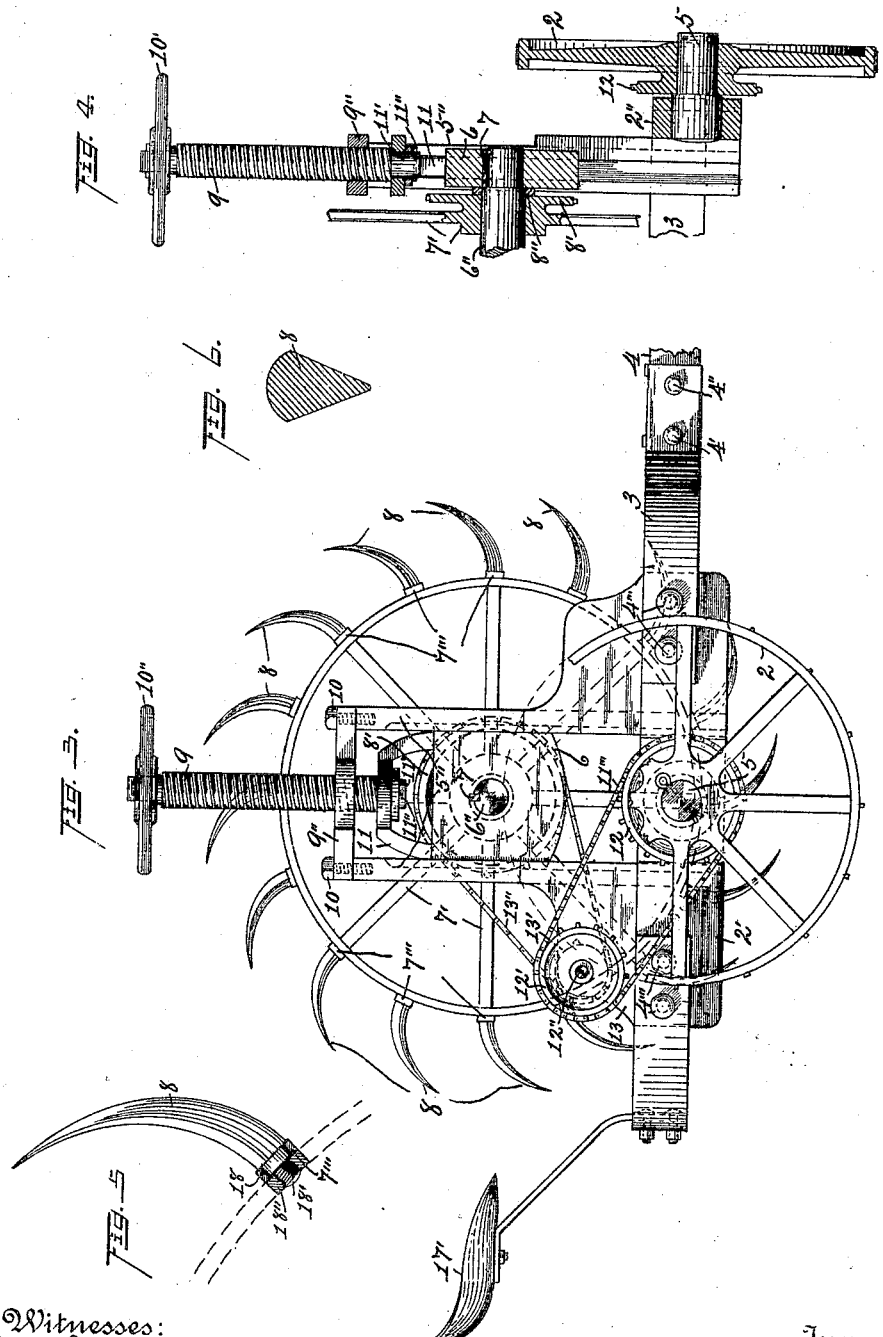

UNITED STATES PATENT OFFICE.

SIGMUND SCHÄLLER, OF HADDAM, CONNECTICUT.

ROTARY HARROW.

971,218. Specification of Letters Patent. Patented Sept. 27, 1910.

Application filed September 24, 1909. Serial No. 519,317.

*To all whom it may concern:*

Be it known that I, SIGMUND SCHÄLLER, a citizen of the United States, and a resident of Haddam, in the county of Middlesex and State of Connecticut, have invented certain new and useful Improvements in Rotary Harrows, which improvements are fully set forth in the following specification.

This invention relates to improvements in harrows, and particularly to harrows of the so-called rotary type; and its object is to provide a rotary harrow which shall be simple and comparatively inexpensive as regards construction; durable, reliable, and of marked efficiency in practical operation; convenient in its application to practical purposes; and which shall possess certain well-defined advantages over prior analogous implements.

The invention consists in the novel combinations, parts and details whereby, together with the novel disposition and relative arrangement of said parts, the attainment of the foregoing object is rendered practicable, all of which will be more specifically referred to hereinafter and set forth in the appended claims.

The invention is clearly illustrated in the accompanying drawings, wherein similar reference-numerals denote corresponding parts throughout the several views, as to which:

Figure 1 is a plan view of a rotary harrow embodying my said improvements. Fig. 2 is a rear elevation of same, a circumferential element of the toothed cylinder made use of being removed to better disclose certain minor details of the construction, and said cylinder being depressed to bring the teeth carried thereby into the soil. Fig. 3 is a side elevation thereof, a portion of the visible carrying-wheel being broken away, and the cylinder aforenamed being elevated to bring the teeth carried thereby out of the soil. Fig. 4 is a detail view, showing in central, vertical section one of the carrying-wheels and parts adjacent thereto. Fig. 5 is an enlarged detail view showing more clearly the manner in which the teeth of my improved harrow are attached to the rotatable cylinder thereof. Fig. 6 is an enlarged transverse section of one of the teeth aforenamed.

In a general sense my present invention comprises a rotatable, toothed cylinder mounted on carrying-wheels, said cylinder and said wheels being arranged to rotate simultaneously in the same direction, and the former at a less rotation-speed than the latter. It further comprises, in a general sense, a rotatable cylinder studded circumferentially with teeth, and mounted on carrying-wheels, said cylinder and said wheels coöperating and varying as to rotation-speed as above specified, and said teeth being essentially curved, preferably in conformity with an involute or irregular curve, rearwardly of the direction of rotative movement of said cylinder.

In carrying out my invention, reference being had to the accompanying drawings, I make use of carrying-wheels 2, 2'; a main frame, preferably comprising opposite end-pieces 2'', 2''', opposite forward members 3, 3', having forwardly turned ends, 3'', 3''', medially between the carrying-wheels aforenamed, and between which ends the pole 4 is fastened, as by means of tie-bolts 4', 4'', said end-pieces and forward and rear frame members being firmly secured together, as by means of tie-bolts 4'''; and said frame having opposite, laterally projecting journals 5, 5', preferably formed integral, as by the process of casting, with the end-pieces 2'', 2''', respectively, and on which journals operate the carrying-wheels 2', 2'', respectively, at the opposite sides of said frame, and each, accordingly, having a fixed axis of rotation; a rotatable, toothed cylinder, supported, between the carrying-wheels aforenamed, by said frame, and admitting of adjustment upwardly and downwardly with respect thereto; and differential transmission mechanism, between said cylinder and one of said carrying-wheels, whereby said cylinder and said carrying wheel are caused to rotate simultaneously in the same direction, and the former at a less rotation-speed than the latter.

Specifically, and as here shown, the end-pieces 22'', 2''', have, preferably formed integral therewith, as by the process of casting, and rising therefrom, the one opposite members constituting a guide 5'', and the other corresponding members constituting a guide 5''', said guides intersecting and extending above and below the axes of said carrying-wheels.

6 denotes a head, coöperating with the guide 5'', and 6' denotes a corresponding head coöperating with the guide 5''', each of said heads being adjustable to and fro vertically along the guide with which it coöperates, preferably between the constituent, upright members thereof, and having a free tongue-and-groove connection therewith, substantially as indicated in the drawings.

6″ denotes a shaft, engaging at its opposite ends the opposite heads 6, 6′, and, in this instance, held against rotative movement with respect thereto, or either thereof, as by means of a key 7. On the shaft 6″ there is mounted a cylinder, preferably of skeleton form, and comprising suitable end-members 7′, 7″, connected by cross-bars 7‴, arranged at suitable intervals circumferentially therealong, and to more or less of which an appropriate number of teeth 8 are attached. The said cylinder is adapted to rotate freely on the fixed shaft 6″; and hence there is attached to, or preferably formed, as by the process of casting, integral with, the end-member 7′ a sprocket-wheel 8′, between which and the head 6, on the shaft 6″, there is interposed a separating collar 8″, while an additional collar 8‴ is disposed on said shaft at the far side of the end-member 7″, the collars 8″, 8‴ accordingly serving to prevent any undue shifting of the cylinder aforenamed longitudinally along the shaft 6″.

It will be here noted that, by duly lowering the heads 6′, 6″, along the guides 5″, 5‴, respectively, said heads accordingly taking with them the shaft 6″, the cylinder aforenamed, with its axis coinciding with a plane registering vertically with the axes of the carrying-wheels aforenamed, may be correspondingly lowered sufficiently to bring the teeth 8, along the underside thereof, into the soil to be treated; while, by reversing this operation, said cylinder may be raised sufficiently to bring the teeth aforenamed out of the soil.

While a variety of means for controlling the adjustments of the toothed cylinder of my improved harrow, may be availed of, I purpose to make use of opposite operating-screws 9, 9′, projecting, respectively, downward through, and having a threaded engagement with, opposite cross-heads 9″, 9‴, fastened, the former to the constituent members of the guide 5″, at the upper extremities thereof, and as by means of fastening screws 10, and the latter to the constituent members of the guide 5‴, at the upper extremities thereof, and as by means of fastening screws 10′, the said operating screws carrying, respectively, at their upper ends, hand-wheels 10″, 10‴, for operating same and each of said operating screws having a swiveled connection with the sliding head coöperating therewith. Specifically, each of said sliding heads has a yoke 11 rising therefrom, and the operating screw coöperating therewith is reduced at its lower portion to form a tip 11′, which projects downwardly and rotatively through the crown of said yoke, where it is held to place by means of a pin 11″, projecting through the tip 11′, below said yoke-crown, said tip having an opening suitable to this end, and the swiveled connection between said operating screw and its coöperating sliding head, being accordingly effected. Hence, by turning the operating screws simultaneously upwardly or downwardly, the cylinder aforenamed may be correspondingly adjusted; or, suitable clearance being provided in the fitting of the parts, one operating screw may be turned somewhat in advance of the other, as occasion may require, to bring the adjacent end of said cylinder upwardly or downwardly somewhat in advance of the opposite end thereof, as will be readily understood.

While any appropriate transmitting mechanism may be employed for transmitting the rotary action of one of the carrying-wheels to the toothed cylinder of my improved harrow, I prefer to attach to, or form, as by the process of casting, integral with said carrying-wheel, as 2, and at the inner extremity of the hub thereof, a driving sprocket-wheel 12, in chain connection, through the medium of an endless chain 11‴, with the intermediate sprocket-wheel 12′, firmly mounted on the counter-shaft 12″, at the outer end thereof, and which projects inwardly through, and bears rotatively in, the bearing 12‴, preferably formed, as by the process of casting, integral with the vertical web 13, which occupies the angle between one of the constituent members of the guide 5″ and the adjacent frame end-piece 2″, there being firmly attached to said counter-shaft, at the inner end thereof, an additional intermediate sprocket-wheel 13′, in chain connection, through the medium of an endless chain 13″, with the sprocket-wheel 8′, carried by the adjacent end-member of the cylinder aforenamed.

The several sprocket-wheels above mentioned are suitably varied as to diameter to insure a retarded rotation-speed on the part of the cylinder aforenamed relatively to the rotation-speed of the carrying-wheel coöperating therewith, said cylinder deriving its rotative action solely from said carrying-wheel, through the medium of the transmission mechanism above described, and said carrying-wheel deriving its rotative action through contact with the ground, when the implement as a whole is driven or drawn, as along a surface of soil to be treated. In other words, the ratio between the movement of the toothed cylinder rotatively on its axis and the movement of this axis lineally forward when the implement as a whole is correspondingly moved, is such that the line of movement of the point of each of the teeth 8 takes approximately the form of an upright loop in the soil, thereby materially enhancing the soil-agitating capacity of said tooth. Again, each of said teeth has a fair cutting-edge along its back, substantially as shown, and has a curvature, approximately cycloidal, or in conformity with an involute or irregular curve, by preference, rearwardly of the direction of rotative movement of said cylinder when the implement is moved along forwardly, so that as the tooth enters the soil, it serves to sever roots, clods of turf, and the like, while another following tooth, or other following teeth, serves or serve to lift to the top of the soil any such severed objects. It will be seen, therefore, that my improved harrow is peculiarly effective as a soil-agitating implement, as the agitating capacity of each of the teeth thereof is confined to that area of the soil where it best meets the requirements of the user, and where it undergoes, as it were, an approximate grinding or churning motion.

I prefer to duplicate the transmission mechanism hereinbefore described, at the opposite side of the implement, and this is essential where duplicate toothed cylinders are availed of and mounted to rotate on the shaft 6″, as indicated in the drawings. Said duplicate transmission mechanism comprises a driving sprocket-wheel 14, attached to the inner extremity of the hub of the opposite carrying-wheel; an intermediate sprocket-wheel 14′, in chain connection with the sprocket-wheel 14, through the medium of an endless chain 14″, the sprocket-wheel 14′ being firmly mounted on a counter-shaft 15, at the outer end thereof, and said shaft rotating in a bearing 15′; and an additional intermediate sprocket-wheel 15″, firmly mounted on the counter-shaft aforenamed, at the inner end thereof, the last-named sprocket-wheel being in chain connection, through the medium of an endless chain 16, with the sprocket-wheel 16′, attached to, or formed integral with, the outer end-member of said duplicate cylinder,—the foregoing parts and elements corresponding, respectively, to the parts and elements embodied in the transmission mechanism first herein described, and relatively arranged accordingly; and said duplicate cylinder comprising an inner end-member 16″ and an outer end-member 16‴, with which the sprocket-wheel 16′ is conjoined, and cross-bars 17, arranged at intervals circumferentially of the members 16″, 16‴, and connecting the same,—the parts 16″, 16‴ and 17 corresponding, respectively, to the parts embodied in the construction of the cylinder first herein described.

The duplicate construction above set forth not only tends to enhance the capacity of the implement, but facilitates the turning thereof, particularly around sharp corners, as will be readily understood; and it will be noted that the upper run of the chain 13″, and likewise the chain 16, when used, slackens somewhat when the toothed cylinder is depressed, and the implement is in practical operation.

While each of the teeth 8 may be secured to the cylinder aforenamed in any common and well known manner, I contemplate primarily reducing the shank thereof to fit snugly into a suitable opening 17″, (Fig. 2), formed in one of the cross-bars of the cylinder, thereby forming a shoulder 18, which gives the tooth a substantial bearing surface on said bar; and again reducing the same to form a tip 18′, which is threaded to receive a substantial holding nut 18″, at the inner face of said bar, all as clearly shown in Fig. 5 of the drawings.

A seat 17′ may be provided at the rear of the implement for the convenience of the user.

The operation of my improved harrow will be apparent from the foregoing description thereof.

That my improved rotary harrow is particularly well adapted for the purposes for which it is intended, will be readily seen; and it will be further observed that the same may be modified to a considerable extent, particularly as regards the means availed of for controlling the adjustments of the toothed cylinder thereof, the specific character of the differential transmission mechanism made use of, and various minor details of the general construction, without materially departing from the spirit and principle of my invention.

I claim:

1. A rotary harrow comprising a frame having carrying-wheels arranged at its opposite sides, said carrying-wheels having, each a fixed axis of rotation; a skeleton, rotatable cylinder, supported by said frame and adjustable upwardly and downwardly along a vertical plane intersecting and extending above and below the axes of said carrying-wheels, between the same, said cylinder comprising suitable end-members, connected circumferentially by a plurality of separated cross-bars; teeth distributed along more or less of said cross-bars, said teeth conforming, each wholly to an irregular curve, turned rearwardly of the direction of movement of said cylinder, when the implement as a whole is moved forwardly along, and provided with a fair knife-edge for an initial cutting action in the ground; means for controlling said cylinder in its upward and downward movements along the vertical plane aforenamed; and retarding transmission mechanism, the latter disposed between and connecting one of said carrying-wheels and said cylinder.

2. A rotary harrow comprising a frame having carrying-wheels arranged at the opposite sides thereof, said carrying-wheels having, each a fixed axis of rotation; vertical guides arranged at the opposite sides of said frame, between said carrying-wheels, and intersecting and extending above and below the axes thereof; heads adjustable upwardly and downwardly along said guides, respectively; a shaft fixedly engaging, at its opposite ends, said heads and adjustable therewith; a skeleton cylinder, mounted to rotate on, and independently of, said shaft, said cylinder comprising suitable end-members, connected circumferentially by a plurality of separate cross-bars; teeth detachably distributed along more or less of said cross-bars, said teeth conforming, each wholly to an irregular curve, turned rearwardly of the direction of movement of said cylinder, when the implement as a whole is moved forwardly along; means for preventing undue displacement of said cylinder along said shaft; means for controlling said heads in the upward and downward movements thereof along said guides, respectively; and retarding transmission mechanism, the latter disposed between and connecting one of said carrying-wheels and said cylinder.

SIGMUND SCHÄLLER.

Witnesses:
ELWYN T. CLARK,
BENJAMIN W. KELSEY.